United States Patent
Soriano et al.

(10) Patent No.: US 10,879,699 B2
(45) Date of Patent: Dec. 29, 2020

(54) POWER REGULATION CIRCUIT AND SYSTEM

(71) Applicant: HEWLETT-PACKARD DEVELOPMENT COMPANY, L.P., Houston, TX (US)

(72) Inventors: David Soriano, Terrassa (ES); Marc Soler, Cabrils (ES); Marina Ferran, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 16/067,634

(22) PCT Filed: Mar. 18, 2016

(86) PCT No.: PCT/EP2016/056060
§ 371 (c)(1),
(2) Date: Jul. 2, 2018

(87) PCT Pub. No.: WO2017/157477
PCT Pub. Date: Sep. 21, 2017

(65) Prior Publication Data
US 2019/0006845 A1    Jan. 3, 2019

(51) Int. Cl.
*H05B 1/02* (2006.01)
*H02J 3/14* (2006.01)
*G03G 15/20* (2006.01)
*G03G 15/00* (2006.01)
*G03G 15/22* (2006.01)

(52) U.S. Cl.
CPC ............ *H02J 3/14* (2013.01); *G03G 15/2039* (2013.01); *G03G 15/80* (2013.01); *H05B 1/0202* (2013.01); *H05B 1/0241* (2013.01); *G03G 15/225* (2013.01); *Y02B 70/3225* (2013.01); *Y04S 20/222* (2013.01)

(58) Field of Classification Search
CPC ....... H02J 3/14; G03B 15/80; G03B 15/2039; G03B 15/225; H05B 1/02; H05B 1/0202; H05B 1/0241; Y02B 70/3225
USPC .................. 219/486, 483, 505, 216, 492
See application file for complete search history.

(56) References Cited

U.S. PATENT DOCUMENTS

| 3,530,300 | A |   | 9/1970 | Gunther |
| 3,567,907 | A | * | 3/1971 | Carpenter ............... C21D 1/40 |
|           |   |   |        | 219/483 |

(Continued)

FOREIGN PATENT DOCUMENTS

| JP | S5491244   | 7/1979 |
| JP | 2001205839 | 7/2001 |

OTHER PUBLICATIONS

"Cautions for Use of SSR"; Dec. 17, 2013; http://www3.panasonic.biz/ac/e_download/control/relay/solid-state/catalog/semieng_caussr.pdf?via=ok.

*Primary Examiner* — Mark H Paschall
(74) *Attorney, Agent, or Firm* — HP Inc. Patent Department

(57) ABSTRACT

A power regulation circuit including an input from an alternating current (AC) power supply, a load element connected to the AC power supply input, a dummy power resistor connected in parallel with the load element, and a controller to dynamically control power to the load element and to the dummy power resistor in response to a variation in the power consumption of the load element.

20 Claims, 3 Drawing Sheets

(56) References Cited

U.S. PATENT DOCUMENTS

| | | | |
|---|---|---|---|
| 3,980,943 A * | 9/1976 | Cailleux | D06F 37/304 |
| | | | 323/244 |
| 4,939,787 A * | 7/1990 | Rubin | H03H 7/38 |
| | | | 330/143 |
| 5,376,773 A * | 12/1994 | Masuda | G03G 15/2003 |
| | | | 219/216 |
| 6,388,852 B1 | 5/2002 | Bobash | |
| 6,522,844 B2 | 2/2003 | Yamane et al. | |
| 7,656,103 B2 | 2/2010 | Shteynberg et al. | |
| 2018/0183317 A1 * | 6/2018 | Nakahara | H02J 3/12 |

* cited by examiner

POWER REGULATION CIRCUIT AND SYSTEM

BACKGROUND

When controlling a high power load such as a heater element, or array of elements, power delivery may be adjusted using methods that turn a connection to the power network off/on.

Some such methods can produce regulatory issues that make it difficult to comply with International Electrotechnical Commission (IEC) regulations, such as rules and regulations relating to flicker, harmonic distortion, conducted emissions, and the like.

BRIEF DESCRIPTION OF THE DRAWINGS

Various features of the present disclosure will be apparent from the detailed description which follows, taken in conjunction with the accompanying drawings, which together illustrate certain example features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Some systems involve switching the power load at alternating current (AC) zero-crossing levels. Such systems are limited in that they introduce a high level of flicker (i.e. rapid voltage fluctuation) into the power line. Reducing or eliminating flicker in the power line can often include bulking and/or expensive systems or hardware. For example some systems involve switching the power load at high frequency, which is often referred to as "phase control". Due to the speed of such systems, they are often are complex and expensive. Further, when using such complex systems, it can be very difficult to meet harmonics and conducted emissions regulations unless bulky input filters are implemented.

Certain examples described herein can include additional dummy high power elements and dedicated algorithms which combine the power switching into application loads with the dummy load(s). A dummy load, such as a high power resistor, can consume power in away that compensates the consumption fall in other elements. Therefore, the power transitions measured at the product inlet contain low frequency variations.

Certain examples comprise a circuit or system that regulates the power into a high voltage load, keeping the disturbance to the AC system below the regulatory limits by dumping the excessive power into a dummy load, thus keeping the input consumption approximately flat.

Figure 1:
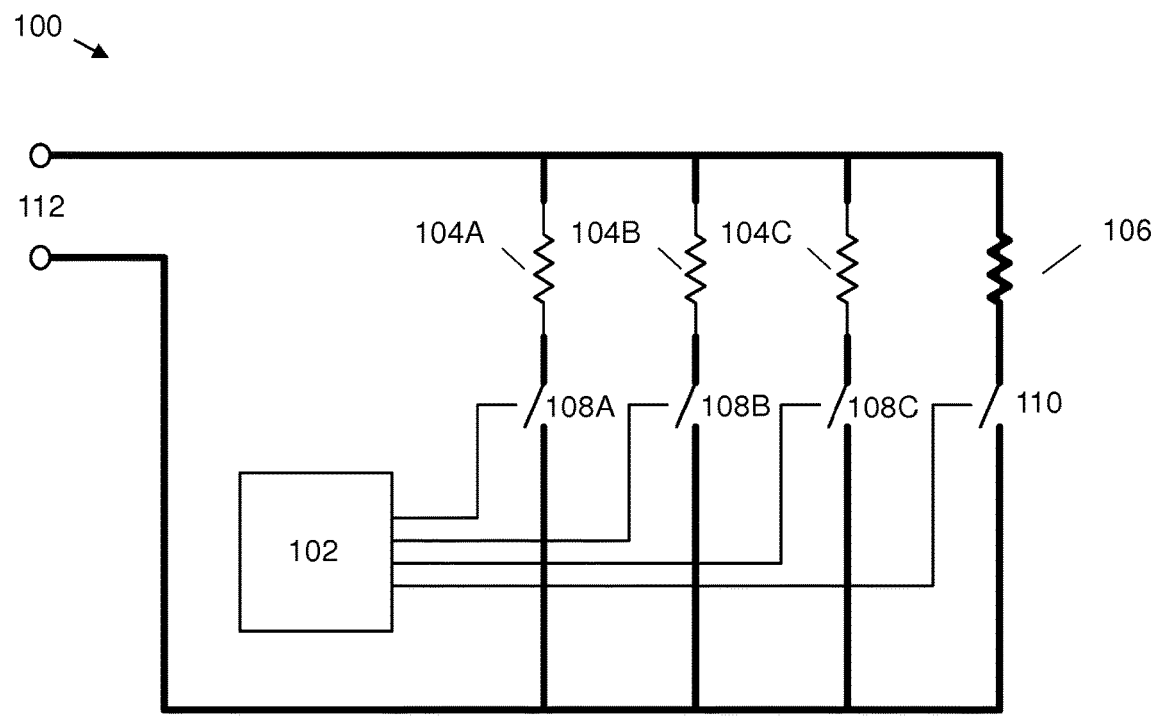
FIG. 1 is a circuit diagram according to an example.

FIG. 1 is a diagram of a circuit 100 according to an example. Example circuit 100 is a power regulation circuit. FIG. 1 depicts controlling three example heater (e.g., load) elements. An adaptive algorithm can be implemented to apply power to each load element depending on its corresponding requirements.

As shown, circuit 100 can include an input 112 from an alternating current (AC) power supply. For example, circuit 100 can comprise load elements 104A, 104B, 104C connected to AC power supply input 112. A dummy power resistor 106 can be connected in parallel with the load elements 104A, 104B, or 104C. Circuit 100 comprises a controller 102 (e.g., a micro-controller) to dynamically control power to the load elements 104A, 104B, 104C and to the dummy power resistor 106 in response to a variation in the power consumption of the load elements 104A, 104B, 104C.

In the example circuit of FIG. 1, the load elements can include the three load elements 104A, 104B, and 104C; in other examples, there may be more than three or fewer than three load elements. In some examples, there may be a single load element.

According to an example, the load elements 104A, 104B, 104C can be connected in parallel across positive and negative input terminals of AC power supply input 112.

According to an example, in response to a power requirement of the load elements 104A, 104B, 104C reducing, dynamically controlling the power can include drawing excess power through dummy power resistor 106.

In certain examples, the load elements 104A, 104B, 104C are connected to AC power supply input 112 via first switch elements 108A, 108B, 108C. In such examples, dummy power resistor 106 is connected to AC power supply input 112 via a second switch element 112. In such examples, controller 102 dynamically controls power to the load elements 104A, 104B, 104C and to dummy power resistor 106 by switching the first 108A, 108B, 108C and second switch elements 110.

According to an example, the switching comprises varying a period of time for which load elements 104A, 104B, 104C are connected to AC power supply input 112 during cycles of AC power supply input 112.

According to an example, the switching comprises varying a period of time for which dummy power resistor 106 is connected to AC power supply input 112 during cycles of AC power supply input 112.

In some examples, the switching comprises reducing the time for which load elements 104A, 104B, 104C are connected to AC power supply input 112 during cycles of AC power supply input 112 by a particular period of time, and increasing the time for which dummy power resistor 106 is connected to AC power supply input 112 during the cycles of AC power supply input 112 by the particular period of time. In some examples, the particular period of time matches a half-cycle of AC power supply input 112.

According to some examples, load elements 104A, 104B, 104C and first switch elements 108A, 108B, 108C are connected in parallel across the positive and negative terminals of AC power supply input 112, and dummy power resistor 106 and the second switch element 110 are connected in parallel across the positive and negative terminals of AC power supply input 112.

Figure 2:
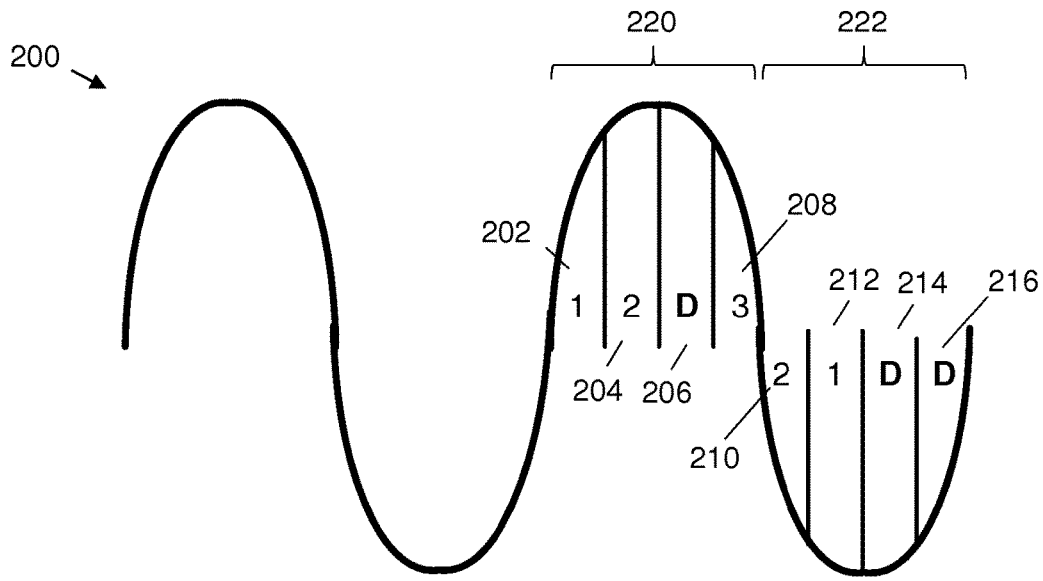
FIG. 2 shows an illustration of an input alternating current sinewave according to an example.

FIG. 2 shows an illustration of an input AC sinewave 200 according to an example.

According to certain examples, possible distortion to the input AC sinewave is minimized, in order to meet regulations. For example, if the power requirements of the load elements are drastically reduced or increased, the transition can be softened by using the dummy power resistor in order to draw the excess of power.

In order to produce lower disturbances to the public power network, it is desirable to have a soft current consumption that matches (or at least approximates) the AC sinusoidal waveform. When adding switching mechanisms to the load, the current consumption observes sharp steps up or down. These steps in current contain high frequency energy, what is not desirable in terms of regulatory compliance. According to examples, softening the transitions in the form of decreasing the slope of these steps, therefore leads to a decrease in high frequency content.

According to examples, the period of time for which power is applied to each element can change and, in some examples, the period of time for which power is applied to an element matches an entire half-cycle.

In examples where the requested power is very low, cycles can be introduced with no transition. In examples, where there are drastic input power consumption changes, a dummy resistor can be employed in to meet with regulatory requirements.

In the example depicted in FIG. 2, in a first half cycle 220 of the AC sinewave, power during a first portion 202 of first half cycle 220 is applied to a first load element 1 (for example load element 104A of FIG. 1), power during a second portion 204 of first half cycle 220 is applied to a second load element 2 (for example load element 104B of FIG. 1), power during a third portion 206 of first half cycle 220 is applied to dummy power resistor D (for example dummy power resistor 106 of FIG. 1), and power during a fourth portion 208 of first half cycle 220 is applied to a third load element 3 (for example load element 104C of FIG. 1).

The power consumption of third load element 3 now reduces, so the power applied to the load elements and the dummy power resistor is dynamically controlled. In the example depicted in FIG. 2, the dynamic control results in power during a first portion 210 of a second half cycle 222 being applied to second load element 2, power during a second portion 212 of second half cycle 222 being applied to first load element 1, power during a third portion 214 of second half cycle 222 being applied to dummy power resistor D, and power during a fourth portion 216 of second half cycle 222 being applied to dummy power resistor D. Dummy power resistor therefore consumes the excess power not required by third load element 3, thus keeping the input consumption approximately flat.

In the examples of FIG. 2, the portions 202, 204, 206 . . . etc. are shown as being of equal time periods. In other examples, any of the portions could have non-equal time periods. In other examples, the periods and/or timing of any of the portions could be calculated using an optimized control algorithm.

FIG. 2 gives some examples of dynamic control across portions of two-half cycles; other examples may involve a different number of portions, a different number of cycles/half cycles, a different number of load elements, and/or more than one dummy power resistor.

Figure 3:
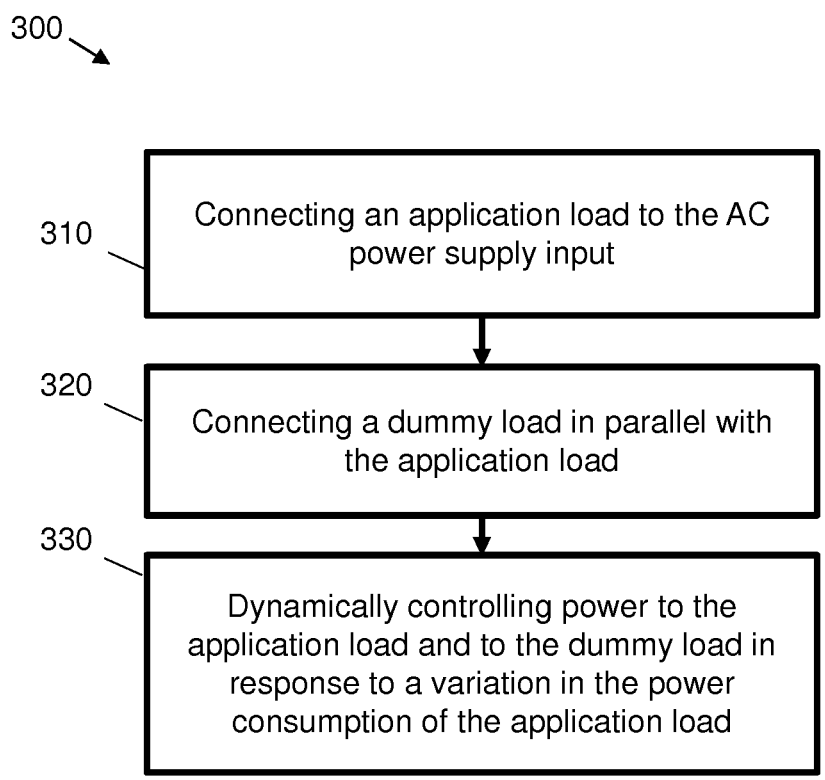
FIG. 3 is a flowchart of a method of controlling a power regulation circuit according to an example.

FIG. 3 is a flowchart of an example method of controlling a power regulation circuit according to an example. The power regulation circuit may include example circuit 100 depicted in FIG. 1. The power regulation circuit can include positive and negative input terminals of an alternating current (AC) power supply input.

At block 310, an application load is connected to the AC power supply input.

At block 320, a dummy load is connected in parallel with the application load.

At block 330, power to the application load and to the dummy load is dynamically controlled in response to a variation in the power consumption of the application load. Some examples of such dynamic control are depicted in FIG. 2 with corresponding description above. Dynamic control may for example be carried out by controller 102 of FIG. 1 or controller 402 of FIG. 4. The controller which performs the dynamic control can be any combination of hardware and executable code or an application-specific integrated circuit (ASIC) that can implement the functionality of the method 300. The controller which performs the dynamic control may for example be an element in a printing or computing system.

In certain examples, the application load is connected to the AC power supply input via a first switch, the dummy load is connected to the AC power supply input via a second switch, and a controller element dynamically controls power to the application load and to the dummy load by switching the first and second switches.

According to an example, the switching comprises varying a period of time for which the application load is connected to the AC power supply during frequency cycles of the AC power supply.

According to an example, the switching comprises varying a period of time for which the dummy load is connected to the AC power supply during frequency cycles of the AC power supply.

Figure 4:
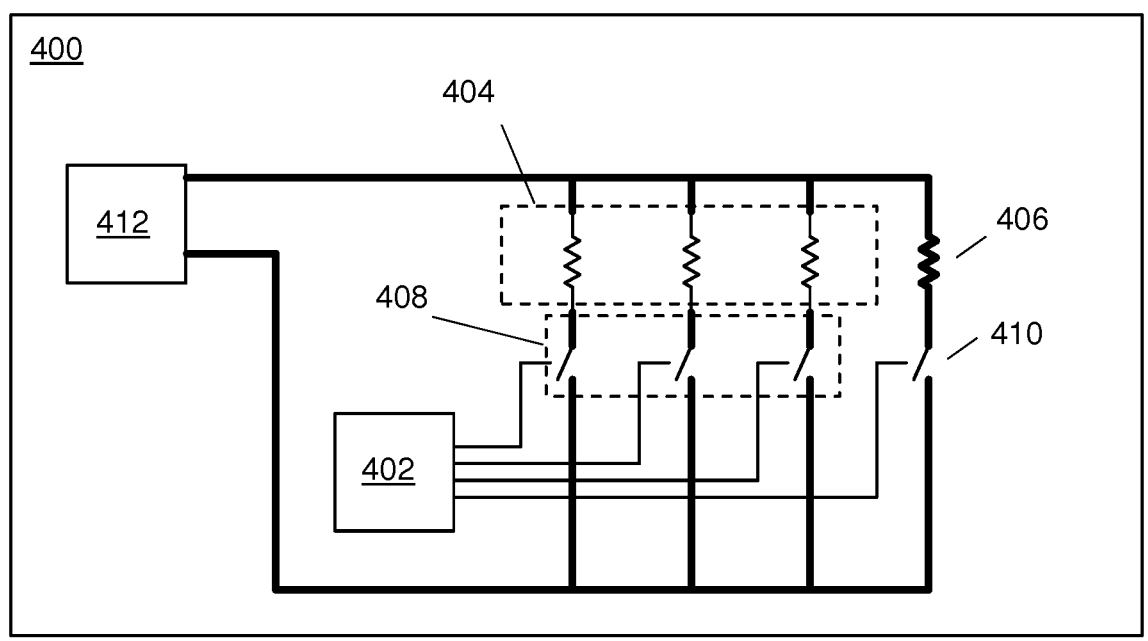
FIG. 4 is a schematic illustration of a printing system according to an example.

FIG. 4 is a schematic illustration of a printing system 400 according to an example.

Printing system 400 may for example comprise a two-dimensional printing system or a three-dimensional printing system.

In the example of FIG. 4, printing system 400 comprises an AC power supply, 412, a plurality of heating elements 404 connected to the AC power supply, a dummy load 406 connected in parallel with the plurality of heating elements 404, a plurality of first switches 408 to connect the plurality of heating elements 404 to AC power supply 412, and a second switch 410 to connect dummy load 406 to AC power supply 412. Heating elements 404 may for example comprise fusing elements for use in fusing processes performed by the printing system.

In the example of FIG. 4, printing system 400 also comprises a controller 402 (which may for example comprise processors and/or memories) to dynamically switch the plurality of first switches 408 and the second switch 410 to control power to the plurality of heating elements 404 and to dummy load 406 in response to a variation in the power consumption of heating elements in the plurality 404 of heating elements.

Certain examples make regulatory compliance (for example with EN61000x international standards) easier using electronics which are not expensive, whilst enabling a variable power delivery to power loads (for example heater elements).

Examples provide relative simplicity and therefore lower cost with respect to approaches. Having an extra power resistor is cheap since a low cost technology resistor can be used.

Examples provide a robust mechanism to meet regulatory requirements. By levelling the consumption across a part of or the entire AC waveform, it is easier to generate a constant power consumption profile, whereas other approaches, such as zero crossing switching or high frequency phase control, provide lots of distortion to the signal and require bulky filters or other means for compensating the signal quality.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A power regulation circuit, the circuit comprising:
an input from an alternating current (AC) power supply;
a load element connected to the AC power supply input;
a dummy power resistor connected in parallel with the load element; and
a controller to dynamically control power to the load element and to the dummy power resistor in response to a variation in the power consumption of the load element.

2. The circuit of claim 1, wherein the load element is connected in parallel across positive and negative input terminals of the AC power supply input.

3. The circuit of claim 1, wherein, in response to a power requirement of the load element reducing, the dynamically controlling the power comprises drawing excess power through the dummy power resistor.

4. The circuit of claim 1, wherein the load element is connected to the AC power supply input via a first switch element,
wherein the dummy power resistor is connected to the AC power supply input via a second switch element,
wherein the controller dynamically controls power to the load element and to the dummy power resistor by switching the first and second switch elements.

5. The circuit of claim 4, wherein the switching comprises varying a period of time for which the load element is connected to the AC power supply input during a cycle of the AC power supply input.

6. The circuit of claim 4, wherein the switching comprises varying a period of time for which the dummy power resistor is connected to the AC power supply input during a cycle of the AC power supply input.

7. The circuit of claim 4, wherein the switching comprises:
reducing the time for which the load element is connected to the AC power supply input during a cycle of the AC power supply input by a particular period of time; and
increasing the time for which the dummy power resistor is connected to the AC power supply input during the cycle of the AC power supply input by the particular period of time.

8. The circuit of claim 7, wherein the particular period of time matches a half-cycle of the AC power supply input.

9. The circuit of claim 4, wherein the load element and the first switch element are connected in parallel across the positive and negative terminals of the AC power supply input, and
wherein the dummy power resistor and the second switch element are connected in parallel across the positive and negative terminals of the AC power supply input.

10. The circuit of claim 1, wherein:
the load element comprises a plurality of different load elements; and
the controller is to assign a portion of each half-cycle of AC power from the AC power supply to one of the plurality of different load elements or to the dummy power resistor.

11. The circuit of claim 10, wherein within a half-cycle of the AC power from the AC power supply, the controller is to assign a portion of the half-cycle to the dummy power resistor.

12. The circuit of claim 10, wherein a first portion of a half-cycle that is assigned to the load elements is not equal to a second portion of the half-cycle assigned to the dummy power resistor.

13. A method of controlling a power regulation circuit, the circuit comprising:
positive and negative input terminals of an alternating current (AC) power supply input;
an application load;
a dummy load connected in parallel with the application load; and
switches for selectively and independently connecting the application load and dummy load to the AC power supply input,
the method comprising:
dynamically controlling power to the application load and to the dummy load in response to a variation in the power consumption of the application load by
reducing a time for which the application load is connected to the AC power supply input during a cycle of the AC power supply input by a particular period of time; and
increasing a time for which the dummy load is connected to the AC power supply input during the cycle of the AC power supply input by the particular period of time.

14. The method of claim 13, wherein the application load is connected to the AC power supply input via a first switch,
wherein the dummy load is connected to the AC power supply input via a second switch,
wherein the controller element dynamically controls power to the application load and to the dummy load by switching the first and second switches.

15. The method of claim 14, wherein the switching comprises varying a period of time for which the application load is connected to the AC power supply during frequency cycles of the AC power supply.

16. The method of claim 14, wherein the switching comprises varying a period of time for which the dummy load is connected to the AC power supply during frequency cycles of the AC power supply.

17. A printing system comprising:
an alternating current (AC) power supply;
a plurality of heating elements connected to the AC power supply, the heating elements arranged within the printing system to fusing material within the printing system;
a dummy load connected in parallel with the plurality of heating elements;
a plurality of first switches to connect the plurality of heating elements to the AC power supply;
and a second switch to connect the dummy load to the AC power supply; and
a controller to dynamically switch the plurality of first switches and the second switch to control power to the plurality of heating elements and to the dummy load in response to a variation in the power consumption of heating elements in the plurality of heating elements.

18. The printing system of claim 17, wherein the system comprises a two-dimensional printing system.

19. The printing system of claim 17, wherein the system comprises a three-dimensional printing system.

20. The printing system of claim 17, wherein the controller is to divide each half-cycle of AC power from the power supply into a plurality of portions and to assign each portion to one of the plurality of heating elements or to the dummy power resistor.

* * * * *